US012790241B2

(12) United States Patent
Linares et al.

(10) Patent No.: US 12,790,241 B2
(45) Date of Patent: Nov. 10, 2026

(54) WATER ACTIVATOR TRANSDUCER

(71) Applicants: Reinerio Linares, Tampa, FL (US); Mauricio Linares Mera, Cali (CO); Juan Carlos Valencia Padilla, Cali (CO); Argemiro Valencia Padilla, Cali (CO); Jose Eliecer Caldono Avila, Cali (CO); Jhon Heiller Martinez Ramos, Cali (CO)

(72) Inventors: Reinerio Linares, Tampa, FL (US); Mauricio Linares Mera, Cali (CO); Juan Carlos Valencia Padilla, Cali (CO); Argemiro Valencia Padilla, Cali (CO); Jose Eliecer Caldono Avila, Cali (CO); Jhon Heiller Martinez Ramos, Cali (CO)

( * ) Notice: Subject to any disclaimer, the term of this patent is extended or adjusted under 35 U.S.C. 154(b) by 948 days.

(21) Appl. No.: 17/364,639

(22) Filed: Jun. 30, 2021

(65) Prior Publication Data

US 2021/0323846 A1 Oct. 21, 2021

Related U.S. Application Data

(63) Continuation-in-part of application No. 16/039,226, filed on Jul. 18, 2018, now abandoned.

(Continued)

(51) Int. Cl.

| | |
|---|---|
| ***C02F 1/467*** | (2023.01) |
| ***C02F 1/46*** | (2023.01) |

(Continued)

(52) U.S. Cl.

CPC .......... *C02F 1/4672* (2013.01); *C02F 1/4608* (2013.01); *C02F 7/00* (2013.01);

(Continued)

(58) Field of Classification Search

CPC .... C02F 1/4672; C02F 7/00; C02F 2103/007; C02F 2201/008; C02F 2201/4613;

(Continued)

(56) References Cited

U.S. PATENT DOCUMENTS 3,653,641 A 4/1972 Eron
3,769,196 A 10/1973 Wikey
(Continued)

FOREIGN PATENT DOCUMENTS

CN 101384380 A 3/2009
CN 103503821 A 1/2014
(Continued)

OTHER PUBLICATIONS

Wikipedia, "Electrostatic fluid accelerator", updated on Apr. 16, 2018, pp. 1-6.
(Continued)

*Primary Examiner* — Ciel P Contreras
(74) *Attorney, Agent, or Firm* — Kunzler Needham Hilton

(57) ABSTRACT

An apparatus for oxygenating water includes a discharge chamber with a fluid inlet and a fluid outlet, an electronic unit coupled to the discharge chamber, and a power source configured to power the electronic unit. The electronic unit is configured to interact with water disposed within the discharge chamber. The electronic unit is configured to apply a sequence of increasing pulses to the water to produce oxygenated water.

20 Claims, 11 Drawing Sheets

Related U.S. Application Data

(60) Provisional application No. 62/534,076, filed on Jul. 18, 2017.

(51) Int. Cl.

| | |
|---|---|
| ***C02F 1/461*** | (2023.01) |
| ***C02F 7/00*** | (2006.01) |
| ***C02F 103/00*** | (2006.01) |
| ***C25B 1/04*** | (2021.01) |
| ***C25B 15/02*** | (2021.01) |

(52) U.S. Cl.

CPC ................ *C25B 1/04* (2013.01); *C25B 15/02* (2013.01); *C02F 2001/46152* (2013.01); *C02F 2103/007* (2013.01); *C02F 2201/008* (2013.01); *C02F 2201/4613* (2013.01); *C02F 2201/46135* (2013.01); *C02F 2201/4614* (2013.01); *C02F 2201/46165* (2013.01); *C02F 2307/06* (2013.01)

(58) Field of Classification Search

CPC ........ C02F 2201/46135; C02F 2307/06; C02F 1/4608; C02F 2001/46152; C02F 2201/4614; C02F 2201/46165; C02F 2201/483; C02F 1/46109; C02F 1/48; C25B 1/04; C25B 15/02

See application file for complete search history.

(56) References Cited

U.S. PATENT DOCUMENTS

| | | | | | |
|---|---|---|---|---|---|
| 3,914,164 | A * | 10/1975 | Clark | C02F 3/34 205/756 |
| 5,085,753 | A | 2/1992 | Sherman | |
| 5,324,398 | A * | 6/1994 | Erickson | C02F 1/008 205/744 |
| 2002/0104807 | A1 | 8/2002 | Keeton, Jr. | |
| 2004/0200731 | A1 | 10/2004 | Sullivan | |
| 2005/0263457 | A1 | 12/2005 | Wilkins et al. | |
| 2006/0180463 | A1 | 8/2006 | Schlager et al. | |
| 2007/0187262 | A1 | 8/2007 | Field et al. | |
| 2008/0164217 | A1* | 7/2008 | Nishizawa | B63J 4/002 210/170.11 |
| 2008/0264800 | A1 | 10/2008 | Schlager et al. | |
| 2011/0010835 | A1 | 1/2011 | McCague | |
| 2013/0206654 | A1* | 8/2013 | Lutz | C02F 1/4672 210/85 |
| 2014/0014344 | A1* | 1/2014 | Daussin | E21B 43/26 166/305.1 |
| 2014/0158639 | A1 | 6/2014 | Caulkins | |
| 2017/0129605 | A1 | 5/2017 | Wu et al. | |
| 2018/0002200 | A1 | 1/2018 | Mehl | |
| 2019/0023590 | A1* | 1/2019 | Linares | C02F 1/4672 |
| 2019/0284073 | A1* | 9/2019 | Yost | C02F 9/00 |

FOREIGN PATENT DOCUMENTS

| | | | |
|---|---|---|---|
| DE | 202004010572 | U1 | 11/2004 |
| JP | 2012161762 | A | 8/2012 |
| JP | 2018146187 | A | 9/2018 |
| WO | 90/10097 | A1 | 9/1990 |
| WO | 97/11908 | A2 | 4/1997 |

OTHER PUBLICATIONS

Wei Wei, "Active Compensation Control of Nonlinear System and Its Application", Metallurgical Industry Press, Jul. 31, 2012, pp. 152-153.

Dang Lifeng, "English Course for Mechanical & Electrical Engineering" , Beijing Institute of Technology Press, Aug. 31, 2017, pp. 189-190.

Zhang Fengming, "User Guide for Borland C++ Builder", Xidan University Publishing House, Sep. 1998, pp. 183-185 (No English Translation Available).

* cited by examiner

WATER ACTIVATOR TRANSDUCER

CROSS-REFERENCES TO RELATED APPLICATIONS

This is a continuation-in-part application of and claims priority to U.S. patent application Ser. No. 16/039,226 entitled "WATER ACTIVATOR TRANSDUCER" and filed on Jul. 18, 2018, for Reinerio Linares et al., which claims the benefit of U.S. Provisional Patent Application No. 62/534,076 entitled "WATER ACTIVATOR TRANSDUCER" and filed on Jul. 18, 2017 for Reinerio Linares et al., each of which is incorporated herein by reference.

FIELD

This invention relates to a water activator transducer and more particularly relates to a portable water activator transducer.

BACKGROUND

Human activities, agriculture, and other environmental conditions often result in anoxic conditions in bodies or sources of water. Depleted of dissolved oxygen, anoxic groundwater has been defined as water with dissolved oxygen concentration of less than 0.5 milligrams per liter. Water oxygenation is a procedure by which oxygen saturation is increased in water. Human understanding of the positive effects of higher levels of oxygen saturation in water is continuously developing. Hydrogen is an essential element for life, it is present in almost all the molecules in living organisms. Hydrogen gas is seen as the clean fuel of the future.

SUMMARY

Apparatuses are disclosed for oxygenating water. In one embodiment, a discharge chamber includes a fluid inlet and a fluid outlet. In a further embodiment, an electronic unit is coupled to the discharge chamber, and configured to interact with water disposed within the discharge chamber. In some embodiments, the electronic unit is configured to apply a sequence of increasing pulses to the water to produce oxygenated water. In a further embodiment, a power source is configured to power the electronic unit.

In one embodiment, a discharge chamber includes a fluid inlet and a fluid outlet. In a further embodiment, an electronic unit is coupled to the discharge chamber, and configured to interact with water disposed within the discharge chamber. In some embodiments, the electronic unit includes a plurality of filaments and a control unit configured to apply voltage pulses to the filaments. In a further embodiment, a power source is configured to power the electronic unit.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms “a,” “an,” and “the” also refer to “one or more” unless expressly specified otherwise.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
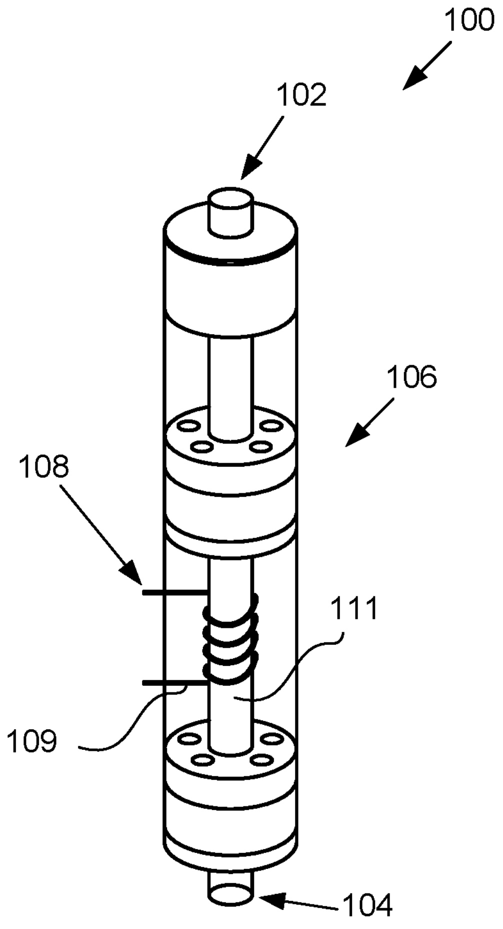
FIG. 1 is a perspective view of an apparatus for oxygenating water, according to one or more embodiments of the present disclosure.

Referring to FIG. 1, a perspective view of an apparatus for oxygenating water 100 is shown. In the illustrated embodiment, the apparatus for oxygenating water 100 is configured to interact with a body of water or water source. The apparatus for oxygenating water 100 includes a water inlet 102 and water outlet 104. Although the apparatus for oxygenating water 100 is shown and described with certain components and functionality, other embodiments of the apparatus for oxygenating water 100 may include fewer or more components to implement less or more functionality.

The apparatus for oxygenating water 100 intakes water from the body of water or water source at the water inlet 102. The apparatus for oxygenating water 100 cycles the water through a discharge chamber 106 which includes an electronic unit 108. After cycling through the discharge chamber and interacting with the electronic unit 108, the water is dispersed out the water outlet 104 and back into the body of water or water source with increased oxygen saturation. In some embodiments, the water flow can be pressurized between 60 and 100 psi.

The apparatus for oxygenating water 100 further includes a power source which provides power to the electronic unit. In some embodiments, the power source is an alternating current power source. In some embodiments, the power source is a direct current power source. The power source may be any combination of conventional power sources for portable devices including batteries or an electrical grid, etc. In some embodiments, the power source may be solar panels or another renewable source.

The apparatus for oxygenating water 100 utilizes the electronic unit to interact with and accelerate the water molecules present in the discharge chamber 106. Within the discharge chamber 106, the water molecules are accelerated to produce oxygen and hydrogen. The excess oxygen increases the oxygen saturation in the remaining water. In some embodiments, as the water in the discharge chamber 106 is accelerated and perturbed, the oxygen interacts with the water at the perturbed water surface to oxygenate the water. In some embodiments, the electronic unit is configured to perturb the water to increase the surface area of the water and increase oxygenation.

Figure 2:
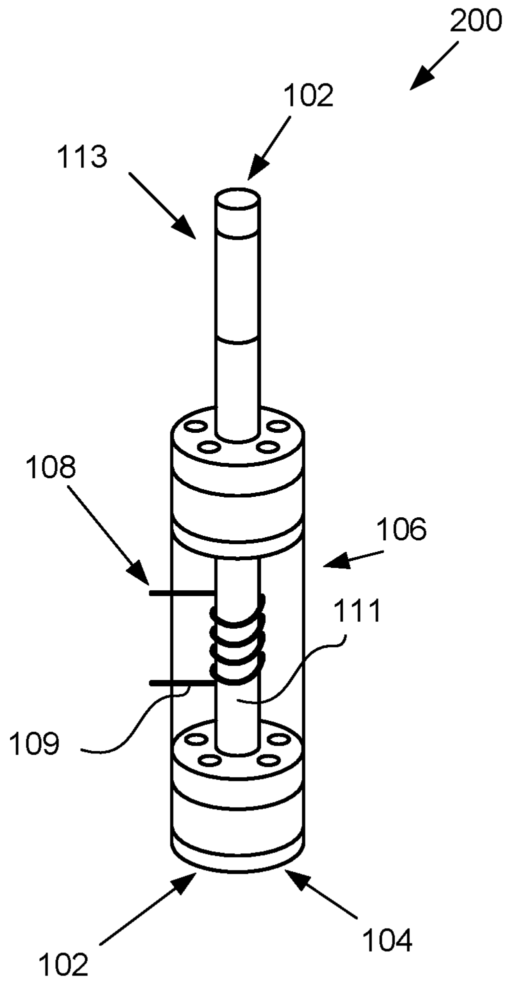
FIG. 2 is a perspective view of an apparatus for oxygenating water, according to one or more embodiments of the present disclosure.

Referring to FIG. 2, a perspective view of an embodiment of a portable apparatus for oxygenating water 200 is shown. The water inlet 102 and water outlet 104 are located on the bottom of the apparatus 200. The discharge chamber 106 or a portion thereof is submerged in water which then intakes water that when cycled through the discharge chamber 106 produces the oxygenated water. In some embodiments, the portable apparatus 200 is configured to be held partially submerged by a handle 115.

The electronic unit 108 includes cell which is submerged in the water within the discharge chamber 106. The cell includes a cathode and an anode. The cathode includes a helicoid-shaped electrode 109 with a predetermined length that surrounds an oppositely charged rod 111 within the discharge chamber.

In some embodiments, application of an algorithm of fragmented codes causes a signal to be generated at the cell and discharged to the water allowing the dissociation and subsequent generation of pico-molecules of oxygen and hydrogen. In addition, within the fragmentation produced by the algorithm is coded information to the water that allows a special molecular reorganization. The discharge has an internal exponential behavior in parameters $Kx^0$, where K is a constant. According to the size of the cell, the feeder system of water intake modulates itself to self-adjust. The apparatus 200 is energy efficient in terms of energy consumption. As the work of the apparatus 200 increases, the average energy consumption is lowered.

Figure 3:
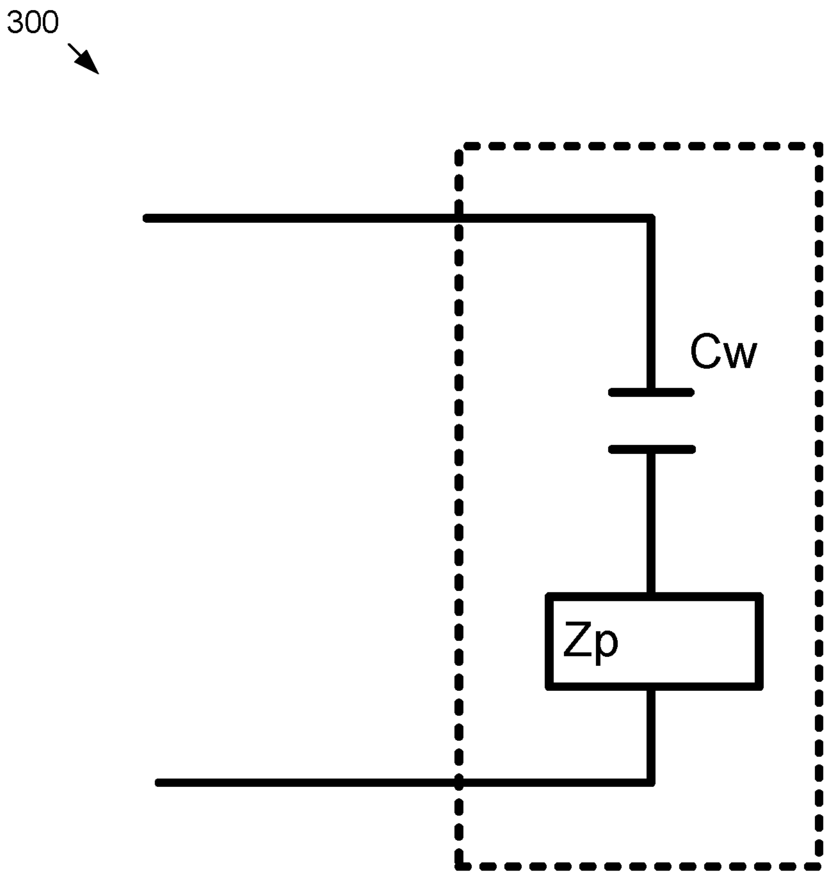
FIG. 3 is a partial schematic diagram of an electronic unit, according to one or more embodiments of the present disclosure.
Figure 4:
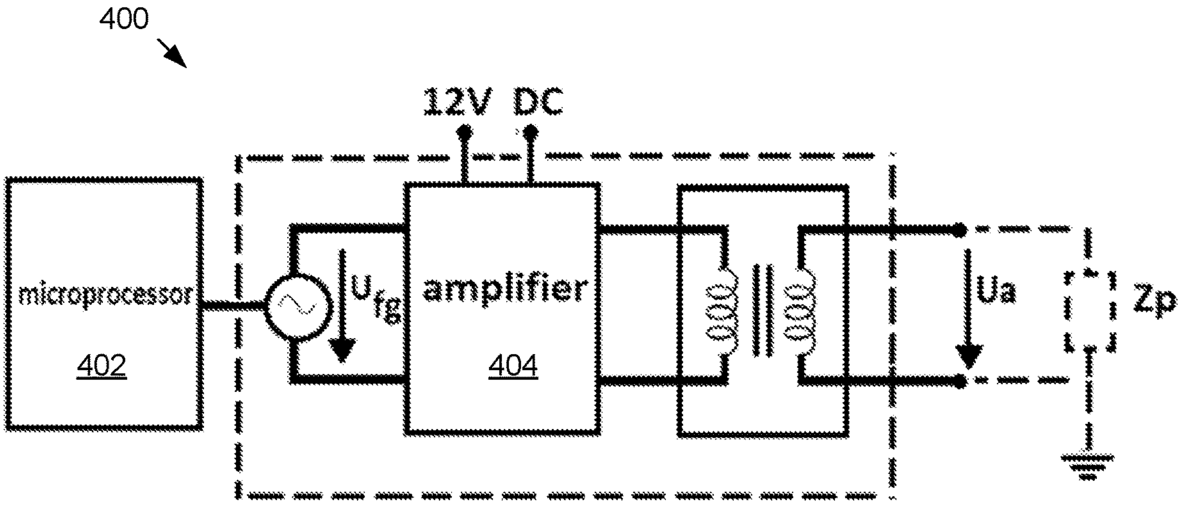
FIG. 4 is a schematic diagram of an electronic unit of an apparatus for oxygenating water, according to one or more embodiments of the present disclosure.

Referring to FIG. 3, a partial schematic diagram 300 of the circuit in the discharge chamber 106 is shown. The discharge chamber 106 is schematically represented by the dashed line 777. As shown in the diagram, $C_w$ is calculated as $$C_w = 2\pi\varepsilon_0(\ell/\mathrm{Ln}(b/a))$$

where $\varepsilon_0$=8.8 E 12 f/m
a=inner radius
b=outer radius
$\ell$=electrode length The impedance of the fluid can be determined from the following equation $$Z_p = (R_p + X_g) + X_w$$

where $Z_p$=Fluid impedance
$R_p$=Fluid resistance
$X_g$=Fluid reactance
$X_w$=Reactance of wall’s capacitance Referring to FIG. 4, a schematic diagram 400 of the electronic unit of an apparatus for oxygenating water is shown. The schematic diagram 400 includes a microprocessor 402, an alternating current voltage source, an amplifier 404, and a transformer. Although the schematic diagram 400 is shown and described with certain components and functionality, other embodiments of the schematic diagram 400 may include fewer or more components to implement less or more functionality. In some embodiments, the electronic unit is configured activate the cathode and the anode within a discharge chamber and/or as is described in conjunction with FIGS. 1 and 2.

Figure 5:
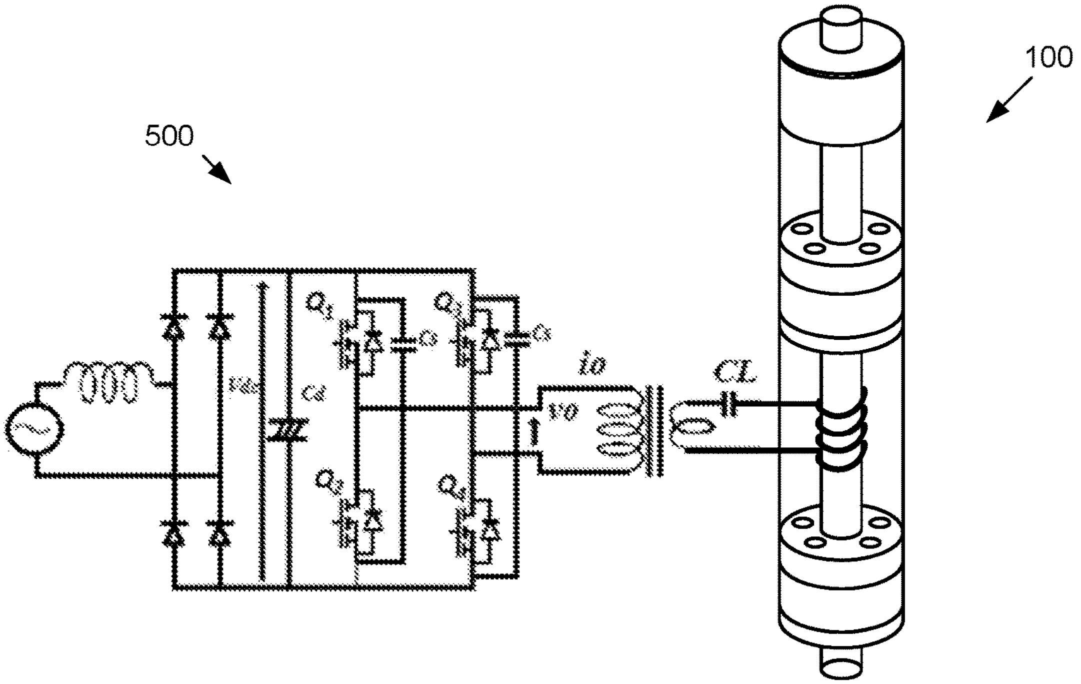
FIG. 5 is a perspective view of an apparatus for oxygenating water and a schematic diagram of the electronic unit, according to one or more embodiments of the present disclosure.

Referring to FIG. 5, a perspective view of the apparatus for oxygenating water 100 and a schematic diagram 500 of the electronic unit is shown in more detail. The schematic diagram 500 includes an alternating current voltage source, an inductor, various diodes and capacitors, and a transformer. Although the schematic diagram 500 is shown and described with certain components and functionality, other embodiments of the schematic diagram 500 may include fewer or more components to implement less or more functionality. In some embodiments, the electronic unit is configured activate the cathode and the anode within a discharge chamber as is described in conjunction with FIGS. 1 and 2.

Figure 6:
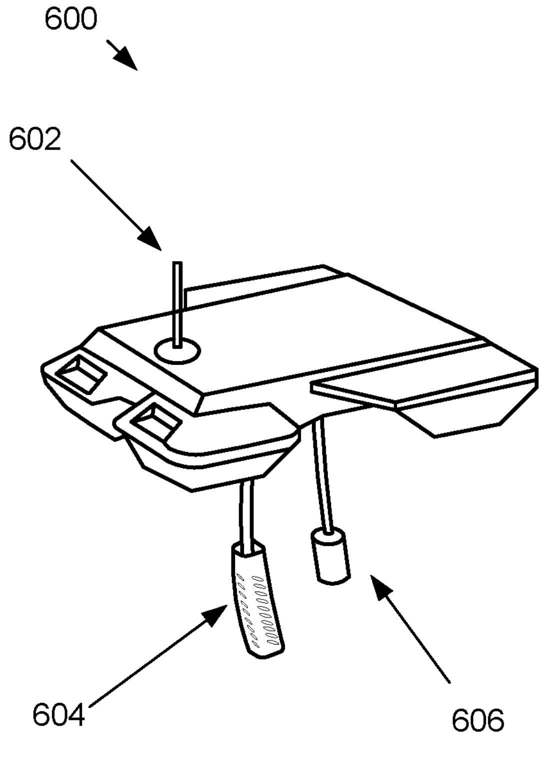
FIG. 6 is a perspective view of a flotation device including an apparatus for oxygenating water, according to one or more embodiments of the present disclosure.
Figure 7:
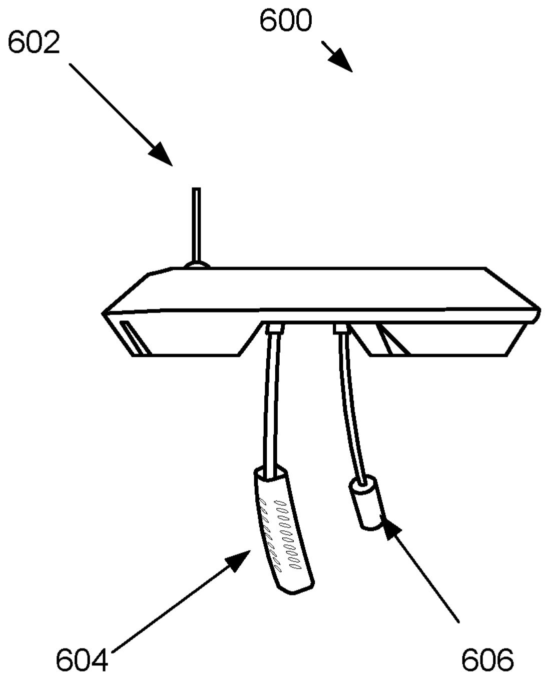
FIG. 7 is a side view of a flotation device including an apparatus for oxygenating water, according to one or more embodiments of the present disclosure.
Figure 8:
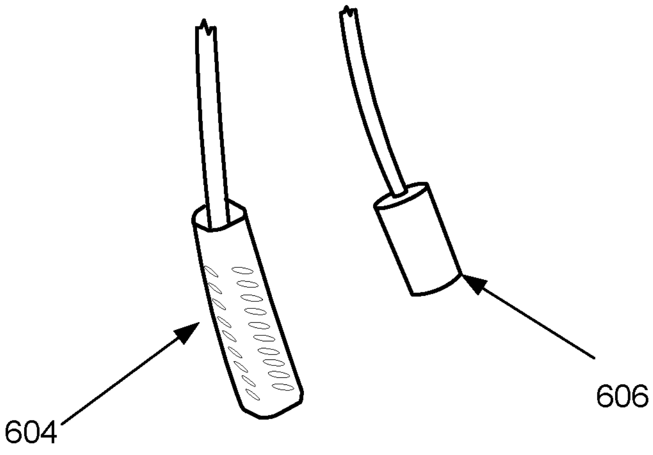
FIG. 8 is a close-up view of the apparatus for oxygenating water of FIG. 6, according to one or more embodiments of the present disclosure.

Referring to FIGS. 6-8, a flotation device 600 is shown. Referring to FIG. 6, a perspective view of a flotation device 600 including an apparatus for oxygenating water 604 is shown. The flotation device 600 may be placed on the surface of a large body of water such as a pool, pond, lake, etc. The flotation device 600 includes an antenna 602 that is configured to generate and/or receive a signal from an external source. The signal may direct or control the flotation device 600 to allow for remote operation of the flotation device based on a set of parameters.

The flotation device 600 further includes an apparatus for oxygenating water 604 located on the underside of the flotation device 600 such that the apparatus for oxygenating water 604 is submerged in the water when the flotation device 600 is floating on the surface of the water. The apparatus for oxygenating water 604 may include some or all of the features and provide some or all of the functionality described above in conjunction with the apparatuses 100, 200. In some embodiments, the flotation device 600 could be static or mobile, and could be operated by telemetry. In some embodiments, the flotation device 600 is configured to carry and disperse enzymes and microorganisms to prepare the contaminated water before the oxygenation.

The flotation device 600 further includes a sensor 606 which is also located on the underside of the flotation device 600 such that the sensor 606 is also submerged in the water when the flotation device 600 is floating on the surface of the water.

The sensor 606 may be configured to detect any of a number of characteristics of the water including, but not limited to, the oxygen saturation level of the water. The sensor readings are fed back to the flotation device 600 and a signal may be sent by antenna 602 to provide accurate and up to date readings of the water and optimize the functioning of the apparatus 604. Although the flotation device 600 is shown and described with certain components and functionality, other embodiments of the flotation device 600 may include fewer or more components to implement less or more functionality.

FIG. 7 depicts a side view of the flotation device 600 and FIG. 8 depicts a close-up view of the apparatus for oxygenating water 604 and sensor 606. The flotation device 600 could be built as big as needed, and could have several of the apparatus 604 needed to do oxygenation of larger bodies of waters, (i.e. lakes, ocean bays, etc.) and could be powered by solar, wind, or other source of energy, or could further be operated with an on board staff, such as for large ships.

Figure 10:
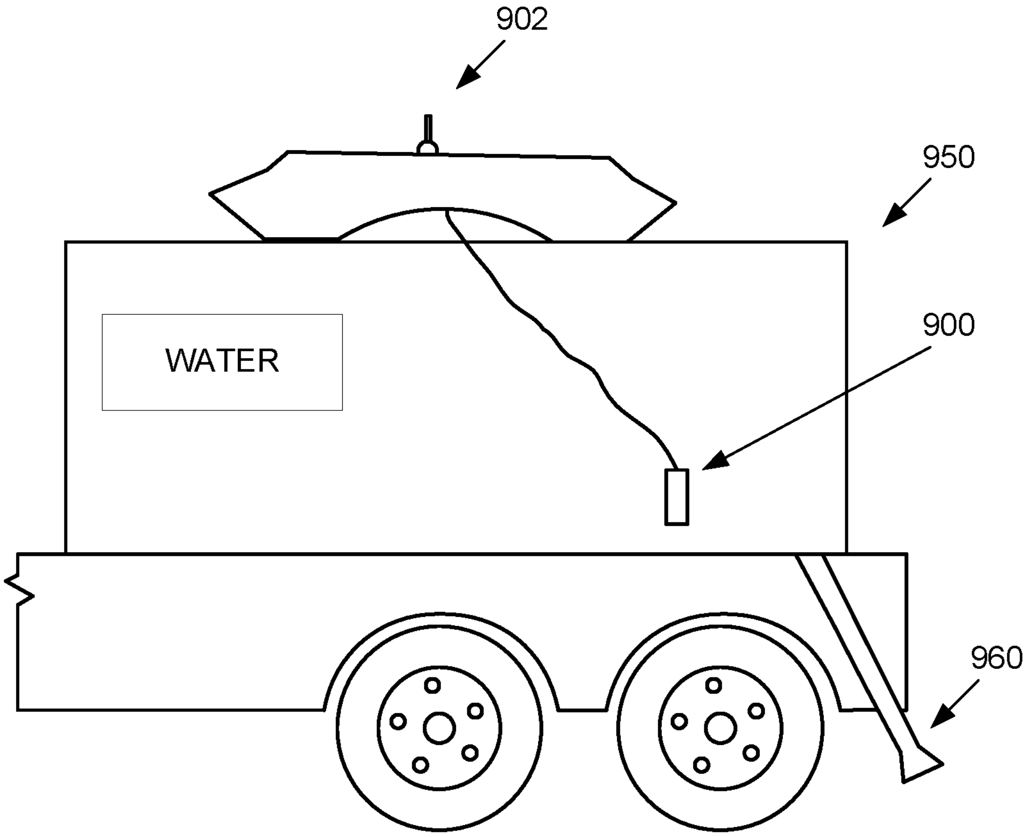
FIG. 10 is a side view of a water truck incorporating an apparatus for oxygenating water, according to one or more embodiments of the present disclosure.

Referring to FIG. 10, a side view of a water truck 950 incorporating an apparatus for oxygenating water 900 is shown. The apparatus 900 may include some or all of the features and provide some or all of the functionality described above in conjunction with the apparatuses 100, 200, 604. The illustrated embodiment further includes a signaling unit 902, including an antenna, which processes, sends, and receives signals to operate and control the apparatus 900 within the water tank of the water truck 950. Although the water truck 950 is shown and described with certain components and functionality, other embodiments of the water truck 950 may include fewer or more components to implement less or more functionality.

Figure 9:
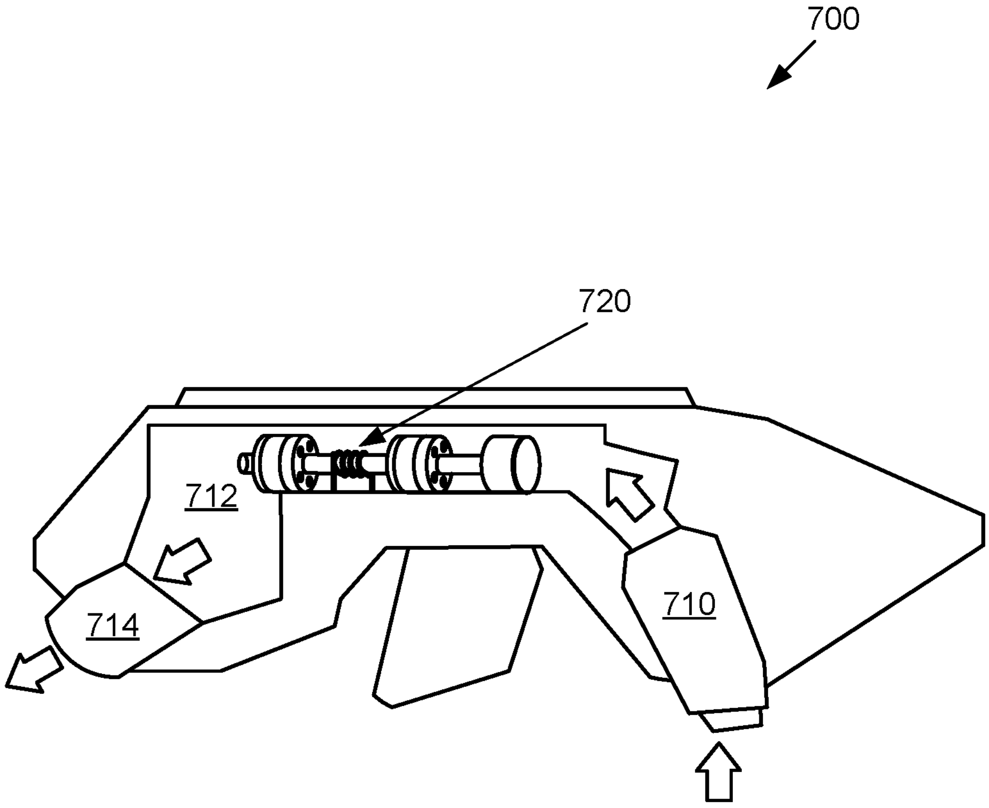
FIG. 9 is a schematic diagram of a flotation device including an apparatus for oxygenating water.

Referring now to FIG. 9, a schematic view of an autonomous flotation device 700 is shown. The autonomous flotation device 700 is made of fiberglass and includes an electronic unit 720 similar to what is described in conjunction with the remaining embodiments described herein. The autonomous flotation device 700 further includes a water suction pump configured to suction water into the autonomous flotation device 700 to interact with the electronic unit 720 and cycled through a chamber 712 housing the electronic unit 720. The treated water is then propelled out a propulsion system 714. In some embodiments, the propulsion system is configured to be adjustable in pressure output and direction, which allows for the control of the floating direction of the autonomous flotation device 700.

The autonomous flotation device 700 allows for the recirculation of a treated water around large lakes of fish hatcheries or pools in the sea for the breeding of shrimp or other fish species.

Figure 11:
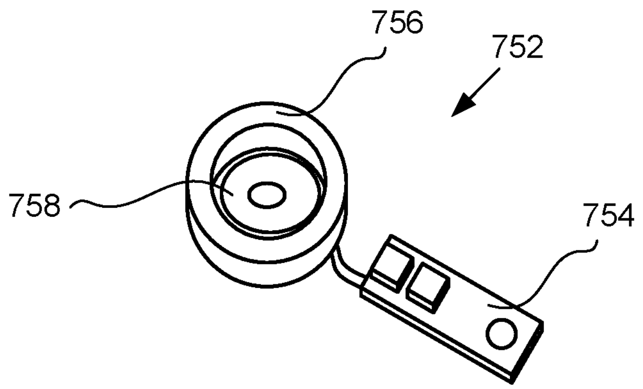
FIG. 11 is a schematic diagram of an apparatus for oxygenating water, according to one or more embodiments of the present disclosure.
Figure 12:
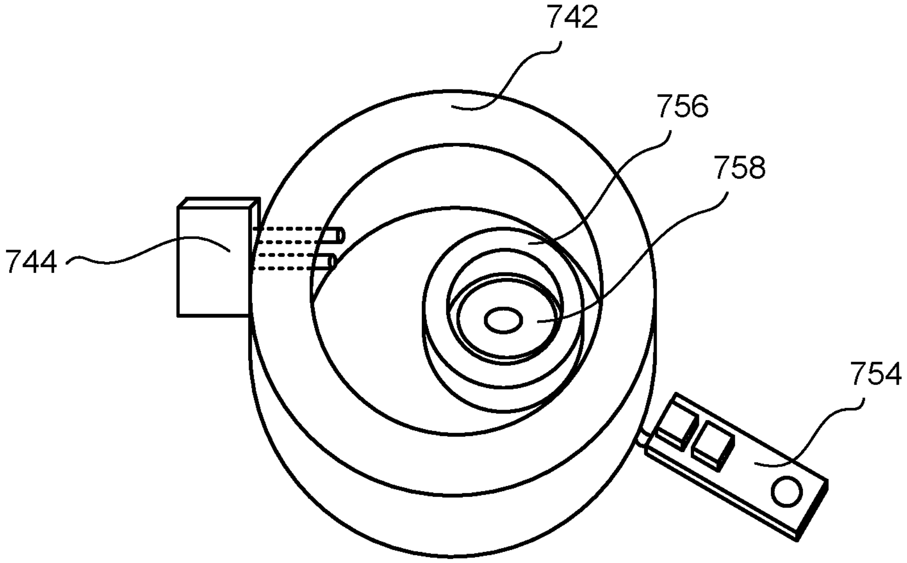
FIG. 12 is a schematic diagram of an apparatus for oxygenating water coupled to a water tank, according to one or more embodiments of the present disclosure.

In some embodiments, the apparatuses described herein are configured to reduce mud odors. Referring to FIG. 12, a storage tank (shown in a cut-away view to allow for the apparatus 752 which is also depicted in FIG. 11). The apparatus 752 includes a control unit 754, a chamber 756 (depicted in a cut-away view), and a transducer 758. The apparatus 752 is housed, at least partially, within the storage tank 742. Also coupled to the storage tank 742 is a pump 744 configured to cycle water (or another fluid) through the storage tank 742 to allow for the treatment of the fluid. In some embodiments, a spray system may be coupled to the storage tank that allows for the spraying of steam or a cloud of treated fluid.

In some embodiments, the apparatuses described herein include an optical sensor that can activate the electronic units by movement or proximity. Other types of sensors may also activate the electronic units.

Figure 13:
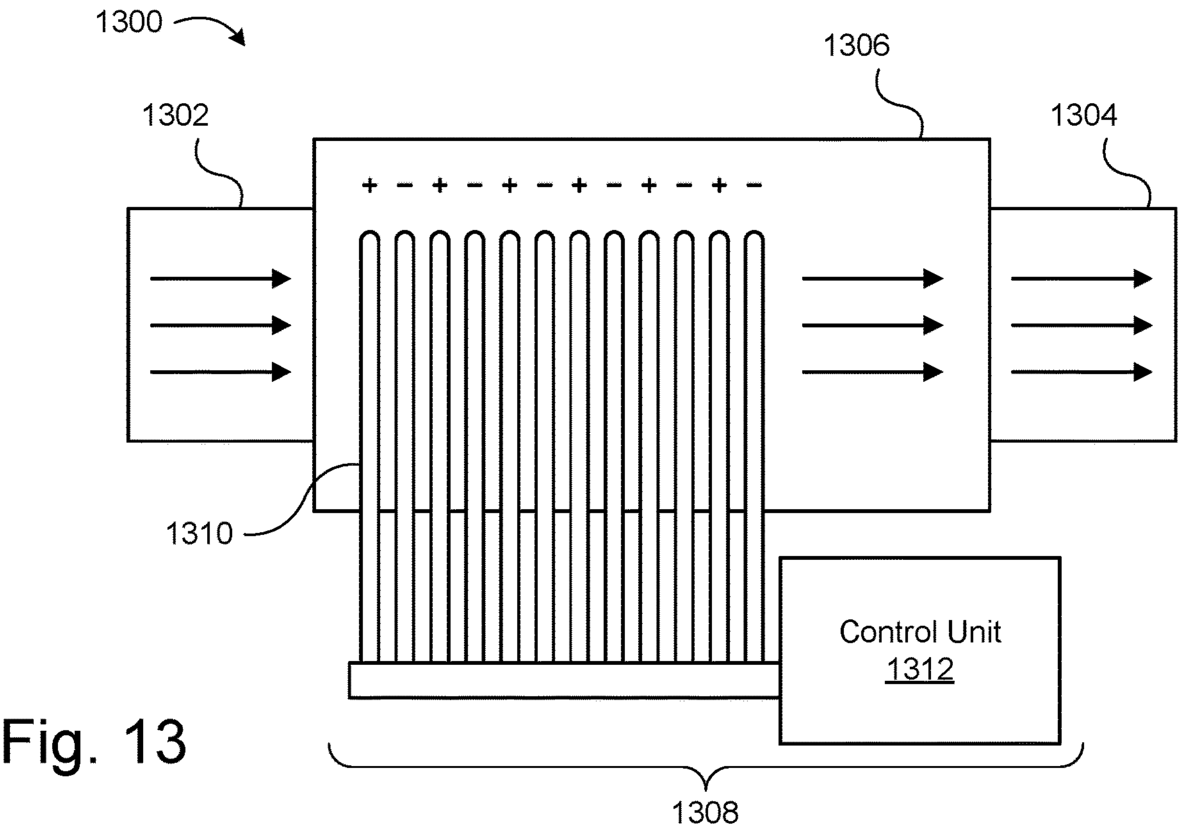
FIG. 13 is a diagram of an apparatus for oxygenating water, according to one or more embodiments of the present disclosure.

Referring now to FIG. 13, a diagram of an apparatus 1300 for oxygenating water is shown. Arrows indicate the direction of water flow through the apparatus 1300. The apparatus 1300 may be substantially similar to the apparatus 100 described above, including a discharge chamber 1306 with a fluid inlet 1302 and a fluid outlet 1304, and an electronic unit 1308 coupled to the discharge chamber 1306, substantially as described above apart from differences which are described below. The diagram is a block diagram, showing certain components as blocks and showing relations between components without implying exact physical positions. However, physical positions of some components such as filaments 1310 are shown, with the discharge chamber 1306 in cross section for viewing of the filaments 1310 inside it. Also, the physical positions of certain components may vary from what is depicted, as described below.

In the depicted embodiment, the electronic unit 1308 includes a plurality of filaments 1310 and a control unit 1312 coupled to the filaments 1310. A filament 1310 may be an elongate object such as a solid or multi-stranded wire, a thin cylinder, a thin object with a triangular, square, or rectangular cross section. A filament 1310 may be electrically conductive so that voltage pulses can be applied to the filament 1310, and to the water in the discharge chamber 1306 via the filament 1310. For example, filaments 1310 may be made of copper, aluminum, stainless steel or another conductive material. Although twelve filaments are depicted in FIG. 13, some apparatuses 1300 may include more or fewer than twelve filaments. For example, a plurality of filaments may include two filaments, thirteen filaments, or another number of filaments.

Similarly, although FIG. 13 depicts a linear array of straight filaments 1310 in sequence, various apparatuses may include filaments that are individually curved or straight, and that are arranged in the discharge chamber 1306 in a half-cylinder, a cylinder, a spiral, wrapped around each other, or the like. The filaments 1310 may be disposed so that a spacing between filaments 1310 is at least a quarter of the diameter of the filaments 1310. The filaments 1310 may be disposed so that a spacing between filaments 1310 is at most the diameter of the filaments 1310. Spacing of the filaments 1310 may be greater or lesser than the above-stated distances based on factors such as the hardness of the water to be treated, or for fluids other than water, based on factors such as the density or surface tension of the liquid to be treated.

The control unit 1312 is electrically coupled to the filaments 1310, either directly or via wires, cables, or the like, and is configured to apply voltage pulses to the filaments. The control unit 1312 may include components for pulse generation, such as a timer integrated circuit coupled to other discrete circuit components, a microprocessor executing stored code, a microcontroller, or the like. The control circuit may include or be coupled to a power source as described above. The control unit 1312 may be waterproofed and disposed, with the discharge chamber 1306, in or in contact with the water to be treated. Alternatively, the control unit 1312 may be disposed further away from the discharge chamber 1306, out of the water to be treated, but may be coupled to filaments 1310 via wires or cables.

The control unit 1312 may be configured to apply opposite pulses to alternating filaments. For example, FIG. 13 depicts polarities of opposite pulses for alternating filaments, so that a positive voltage pulse is applied to the first, third, fifth, seventh, ninth, and eleventh filaments, while a negative voltage pulse (e.g., of equal magnitude but opposite polarity) is applied to the second, fourth, sixth, eighth, tenth, and twelfth filaments.

A pulse may include an on time, and an off time, where a voltage of non-zero magnitude (and positive or negative polarity, depending on which filament 1310 the pulse is applied to) is applied during the on time, and a zero-magnitude signal is applied during the off time (e.g., the filaments 1310 are grounded, allowed to return to the voltage of the surrounding water, or the like). The duty cycle for a pulse, or the percentage of on time to on time plus off time until the next pulse begins, may be 50% (equal on time and off time), or may be less than or greater than 50%.

The electronic unit 1308 may apply a sequence of increasing pulses to the water within or flowing through the discharge chamber 1306. For example, the control unit 1312 may apply pulses of increasing voltage magnitude to the filaments. In some embodiments, increasing the magnitude of pulses in a sequence may increase oxygenation of the water compared to using a sequence of constant-magnitude pulses.

A sequence of increasing pulses may include a finite number of increasing pulses, and may be repeated multiple times as water flows through the apparatus 1300. Various sequences of increasing pulses may be applied. For example, pulses may increase linearly over time, or may increase based on a geometric sequence, a sequence defined by a polynomial, an exponential sequence, the Fibonacci sequence, or the like. One example of an increasing sequence of 144 pulses is described below. In this example, P represents the magnitude of the first or smallest non-zero pulse in an increasing sequence, T represents time as an integer number of pulses in the sequence (advancing sequentially from zero), and F(T) represents the pulse magnitude at time T.

$$\text{For } T=0,\ F(T)=T*P=0$$

$$\text{For } T=1 \text{ to } T=143,\ F(T)=F(T-1)+T*P$$

Thus, in this example, the magnitude of each pulse is equal to the magnitude of the previous pulse, plus a step size which increases by P at each step, so that pulse 1 is increased by 1P from pulse 0, pulse 2 is increased by 2P from pulse 1, pulse 3 is increased by 3P from pulse 2, and so on until the 144th pulse is applied and the sequence ends (or is restarted).

Figure 14:
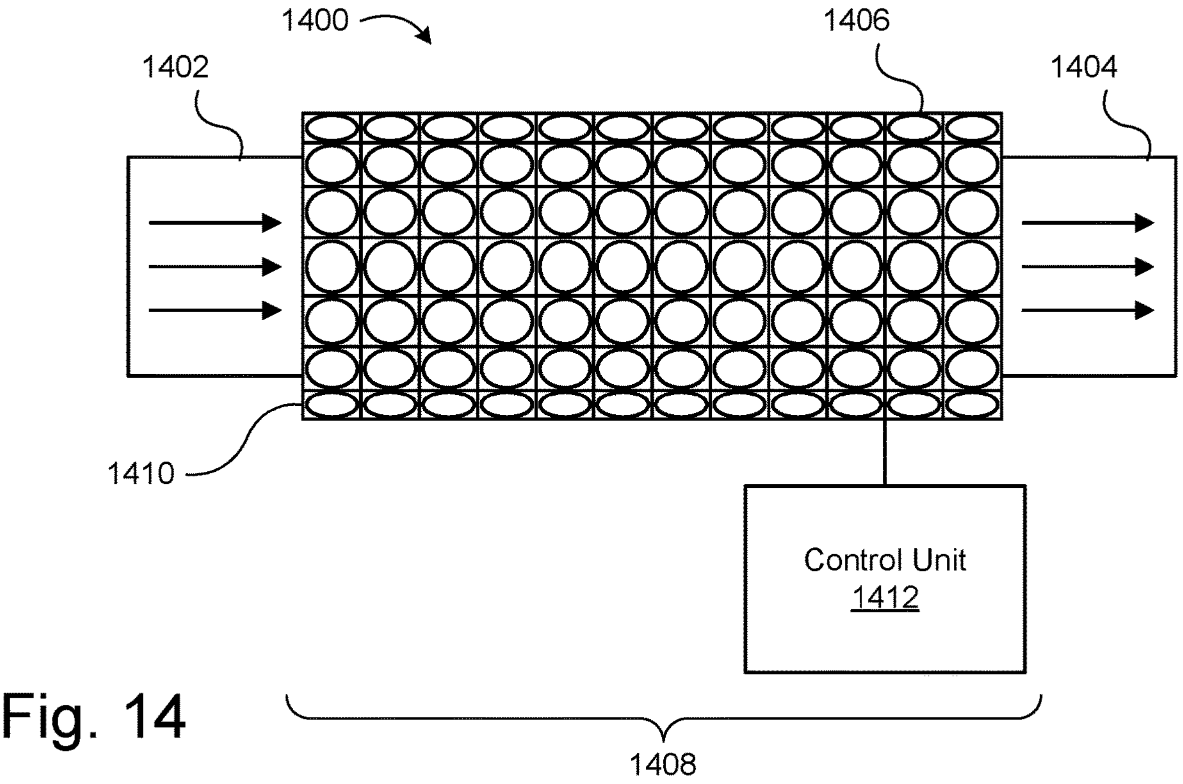
FIG. 14 is a diagram of an apparatus for oxygenating water, according to one or more embodiments of the present disclosure.

Referring to FIG. 14, a diagram of an apparatus 1400 for oxygenating water is shown. Arrows indicate the direction of water flow through the apparatus 1400. The apparatus 1400 may be substantially similar to the apparatus 1300 described above, including a discharge chamber 1406 with a fluid inlet 1402 and a fluid outlet 1404, and an electronic unit 1408 coupled to the discharge chamber 1406, substantially as described above apart from differences which are described below. The diagram is a block diagram, showing certain components as blocks and showing relations between components without implying exact physical positions. However, physical positions of some components such as light emitters 1410 are shown. Also, the physical positions of certain components may vary from what is depicted.

In the depicted embodiment, the electronic unit 1408 includes a plurality of light emitters 1410 disposed around the discharge chamber 1406, and a control unit 1412 configured to pulse the light emitters 1410. Light emitters may be components that produce light, such as light emitting diodes, light bulbs, or the like. In some examples, light emitters 1410 may include reflectors to direct the light into the discharge chamber 1406. The light produced by the light emitters 1410 may be white light, blue light, yellow light, red light, green light, ultraviolet light, or another color or mix of colors. In one example, light emitters 1410 may be disposed to emit light in beams passing through the center or axis of a cylindrical discharge chamber 1406. In another example, light emitters 1410 may be oriented to emit light toward the tangent of a hypothetical cylinder half the diameter (but coaxial with) the discharge chamber 1406.

The control unit 1412 may be coupled to the light emitters 1410 to control operation of the light emitters 1410 by turning the light emitters 1410 on and off, controlling the intensity of the emitted light, or the like. The electronic unit 1408 may apply a sequence of increasing pulses to the water in the discharge chamber 1406 to produce oxygenated water. For example, the control unit 1412 may pulse the light emitters 1410 so that the light emitters 1410 emit light pulses of increasing intensity. In one example, the control unit 1412 may pulse the light emitters to emit an increasing sequence of pulses as described above for voltage pulses with reference to FIG. 13. The control unit may include circuitry for pulse generation such as discrete timing circuitry, a microprocessor, a microcontroller, a power source, or the like.

Figure 15:
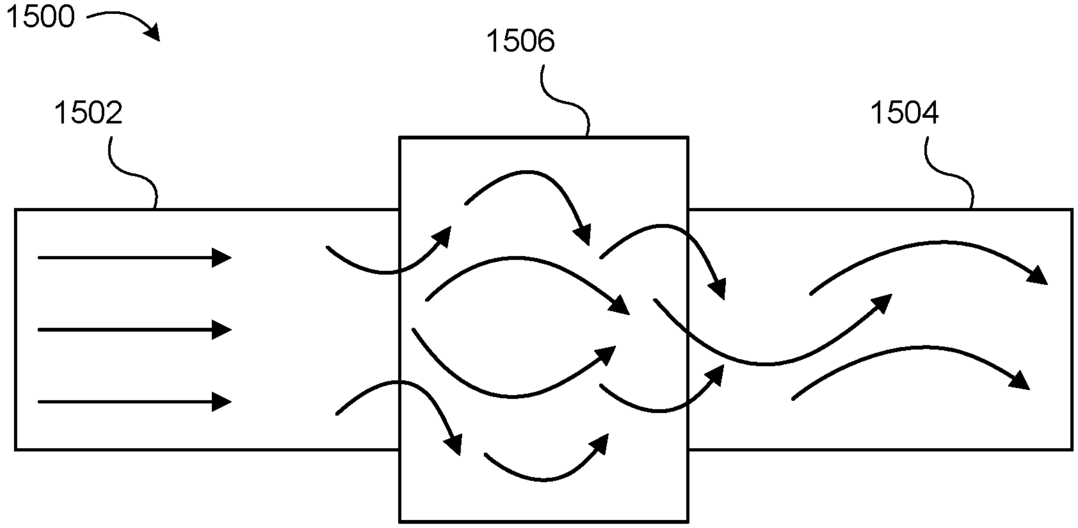
FIG. 15 is a diagram of components for increasing turbulence in an apparatus for oxygenating water, according to one or more embodiments of the present disclosure.

Referring to FIG. 15, components 1500 for increasing turbulence in an apparatus for oxygenating water are shown. In some example, oxygenation of water by voltage pulses and/or light pulses may be facilitated by increasing turbulence of the water flowing through the apparatus. The depicted components include one or more portions 1502,

1504 with a first diameter, and at least one portion 1506 with a second diameter greater than the first diameter. Varying-diameter portions 1502, 1506, 1504 may be the inlet, discharge chamber, and outlet of an apparatus for oxygenating water, where the discharge chamber is the portion 1506 of greater diameter, or may be coupled to a discharge chamber to increase turbulence of the water flowing into the discharge chamber.

Arrows represent the flow of water through components 1500. In some examples, where D represents the diameter of the first portion 1502, a second portion 1506 may have a greater diameter than D, up to 2D, to change laminar flow in the first portion 1502 to turbulent flow in the second portion 1506. In some examples, multiple portions of varying diameters may be provided.

Figure 16:
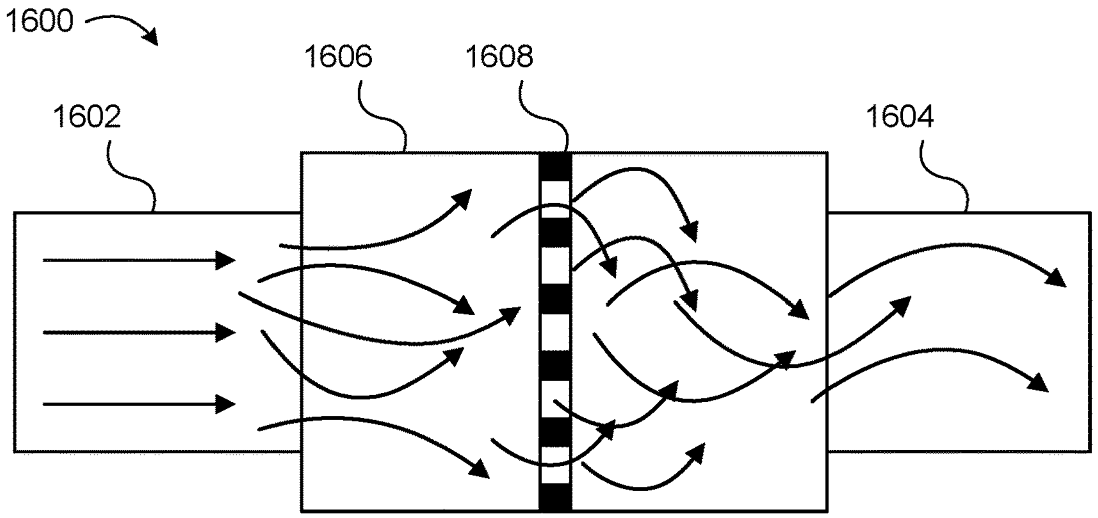
FIG. 16 is a diagram of components for increasing turbulence in an apparatus for oxygenating water, according to one or more embodiments of the present disclosure.

Referring to FIG. 16, components 1600 for increasing turbulence in an apparatus for oxygenating water are shown. As in FIG. 15, arrows show the flow of water, and the components include varying-diameter portions 1602, 1606, 1604, with the second portion 1606 having a greater diameter than the first portion 1602. In this example, a perforated plate 1608 is disposed in the second portion 1606, to further increase turbulence beyond the turbulence caused by the change in diameter. In some examples, where the diameter of the second portion 1606 is at least 1.5 times the diameter of the first portion 1602, one or more perforated plates 1608 may be provided.

Figure 17:
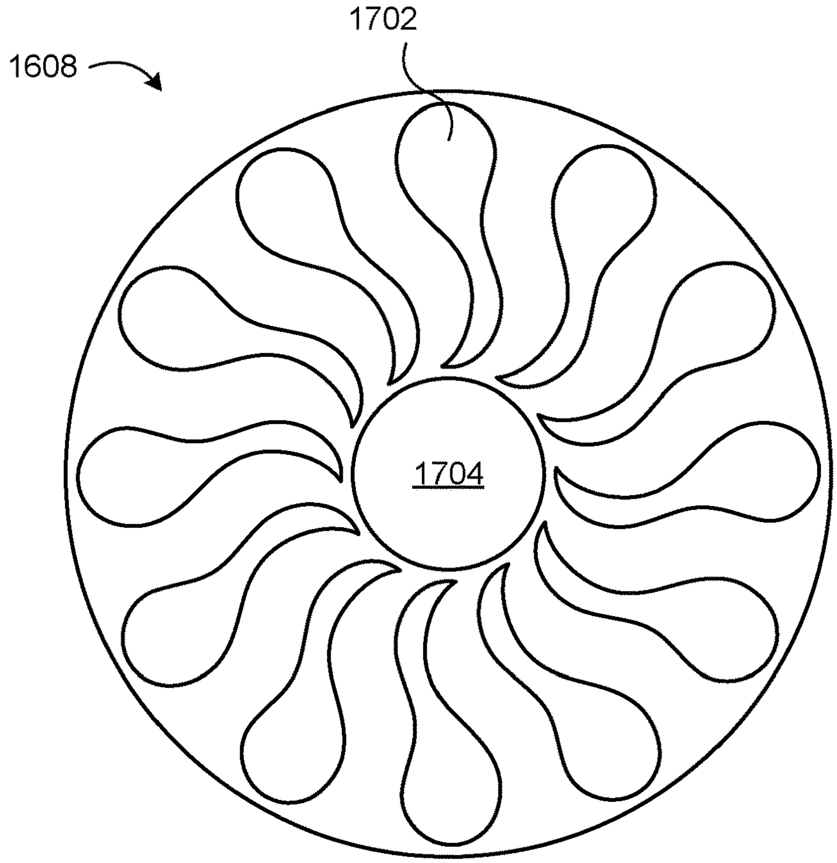
FIG. 17 is a front view of a perforated plate, according to one or more embodiments of the present disclosure.

Referring to FIG. 17, one example of a perforated plate 1608 is shown, as described above with reference to FIG. 16. In the depicted example, the perforated plate 1608 includes a plurality of elongate openings 1702 arranged in a circle around a central circular opening 1704. In various further examples, a perforated plate may include openings of various shapes, sizes, and numbers. For example, a perforated plate may include an array of small circular openings, a mix of smaller and larger openings, a grid of square or rectangular openings, or the like.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item B; item C; item A and item B; item A and item C; item B and item C; or item A, item B, and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for oxygenating water comprising:

a discharge chamber with a fluid inlet and a fluid outlet;

an electronic unit comprising a cell coupled to the discharge chamber, the cell comprising an anode and a cathode and a plurality of filaments and configured to apply a sequence of at least one of increasing voltage or light pulses to the water within the discharge chamber to produce oxygenated water;

the cell accepting application of an algorithm of fragmented codes generating a series of voltage pulses generating a signal discharge from the cell to the water;

an electronic control unit programmed to generate the signal discharge to the water wherein the magnitude of each pulse is equal to the magnitude of the previous pulse, plus a step size which increases by P at each step, so that pulse 1 is increased by 1P from pulse 0, pulse 2 is increased by 2P from pulse 1, pulse 3 is increased by 3P from pulse 2, and so on until the final pulse is applied and the signal discharge ends or is restarted; and the signal discharge having an internal exponential behavior in parameters $Kx^0$, where K is a mathematical constant determined by the size of the cell and is multiplied by X to the zero potency, said signal discharge triggering the dissociation and subsequent generation of pico-molecules of oxygen and hydrogen in a resulting molecular reorganization.

2. The apparatus for oxygenating water according to claim 1, wherein the filaments comprise at least one of an electrically conductive material including a metallic material and a light transmitting material including a fiber optic.

3. The apparatus for oxygenating water according to claim 2, wherein the electronic control unit is configured to apply opposite voltages to at least one set of alternating filaments in the plurality of filaments.

4. The apparatus for oxygenating water according to claim 2, wherein a spacing between the filaments is greater than or equal to a quarter of a filament diameter and less than or equal to the filament diameter.

5. The apparatus of claim 4, further comprising a plurality of light emitters comprising components including a light emitting diode, a light bulb, a reflector, a fiber optic or the like that produce, direct, or reflect light of any color or ultraviolet wavelength.

6. The apparatus for oxygenating water according to claim 1, further comprising a first portion having a first diameter and a second portion having a second diameter greater than the first diameter, to increase turbulence in the water.

7. The apparatus of claim 6, further comprising a perforated plate disposed in the second portion.

8. The apparatus for oxygenating water according to claim 1, further comprising a flotation device configured to float on an external water source, wherein the discharge chamber is housed within the flotation device.

9. The apparatus for oxygenating water according to claim 8, wherein the flotation device further comprises:

a pump configured to intake water into the discharge chamber;

an optional sensor positioned to sense at least one of the biological content, toxin, load, odor, silt concentration, oxygenation, or other quality of the external water source; and a discharge outlet configured to discharge the oxygenated water after the electronic unit has accelerated the water within the discharge chamber.

10. The apparatus for oxygenating water according to claim 9, wherein the discharge outlet is configured to discharge the oxygenated water into the external water source and propel the flotation device along a surface of the external water.

11. The apparatus for oxygenating water according to claim 1, wherein the electronic unit is configured to perturb the water to increase the surface area of the water and increase oxygenation.

12. The apparatus for oxygenating water according to claim 1, wherein the apparatus is completely submerged in a water source.

13. The apparatus for oxygenating water according to claim 1, wherein the apparatus is only partially submerged in a water source to oxygenate the water.

14. The apparatus for oxygenating water according to claim 1, wherein the apparatus is coupled to a water tank.

15. The apparatus for oxygenating water according to claim 1, wherein the apparatus is coupled to a faucet.

16. A method for oxygenating water the method comprising:

providing an apparatus comprising:

a discharge chamber comprising a fluid inlet and a fluid outlet;

an electronic unit coupled to the discharge chamber, the electronic unit comprising a cell within the discharge chamber, the cell comprising an anode and a cathode and a plurality of filaments, the cell accepting application of an algorithm of fragmented codes generating a series of voltage pulses generating a signal discharge from the cell to the water;

an electronic control unit programmed to generate the signal discharge to the water wherein the magnitude of each pulse is equal to the magnitude of the previous pulse, plus a step size which increases by P at each step, so that pulse 1 is increased by 1P from pulse 0, pulse 2 is increased by 2P from pulse 1, pulse 3 is increased by 3P from pulse 2, and so on until the final pulse is applied and the signal discharge ends or is restarted;

the signal discharge having an internal exponential behavior in parameters Kx0, where K is a mathematical constant determined by the size of the cell, said signal discharge enabling triggering the dissociation and subsequent generation of pico-molecules of oxygen and hydrogen in a resulting molecular reorganization;

a power source configured to power the electronic unit;

placing the apparatus in contact with water; and operating the apparatus to treat the water.

17. The method for oxygenating water according to claim 16, wherein the provided apparatus is at least one of submersible, flotation, self propelling, or operated in a container including a water truck and further comprises an optional sensor positioned to sense at least one of the biological content, toxin, load, odor, silt concentration, oxygenation, or other quality of the external water source.

18. The method for oxygenating water according to claim 16, wherein the provided control unit is configured to apply opposite voltages to at least one set of alternating filaments in the plurality of filaments.

19. The method for oxygenating water according to claim 16, wherein the method further comprises treating the water for at least of an odor including a mud odor, a biological content, an oxygen concentration, a toxin load, a silt concentration or other property.

20. A system for oxygenating water, the system comprising:

a. an apparatus for oxygenating water, b. a sensor for interrogating water, c. a discharge chamber, d. a cell within the discharge chamber comprising an anode and a cathode and a plurality of filaments, the cell accepting application of an algorithm of fragmented codes generating a series of voltage pulses generating a variable and/or increasing signal discharge from the cell to the water;

e. an electronic control unit coupled to the sensor and to the apparatus, the electronic control unit programmed to issue signals for treating the oxygen level and other parameters of the water according to a preprogrammed instruction or an external command, wherein the magnitude of each pulse is equal to the magnitude of the previous pulse, plus a step size which increases by P at each step, so that pulse 1 is increased by 1P from pulse 0, pulse 2 is increased by 2P from pulse 1, pulse 3 is increased by 3P from pulse 2, and so on until the final pulse is applied and the signal discharge ends or is restarted.

* * * * *